United States Patent
Yin et al.

(10) Patent No.: US 11,343,456 B2
(45) Date of Patent: May 24, 2022

(54) DYNAMIC VISION SENSOR

(71) Applicant: Guangzhou Tyrafos Semiconductor Technologies Co., LTD, Guangzhou (CN)

(72) Inventors: Ping-Hung Yin, Taipei (TW); Jia-Shyang Wang, Miaoli County (TW)

(73) Assignee: Guangzhou Tyrafos Semiconductor Technologies Co., LTD, Guangzhou (CN)

( * ) Notice: Subject to any disclaimer, the term of this patent is extended or adjusted under 35 U.S.C. 154(b) by 0 days.

(21) Appl. No.: 17/234,806

(22) Filed: Apr. 20, 2021

(65) Prior Publication Data
US 2022/0014702 A1 Jan. 13, 2022

Related U.S. Application Data

(60) Provisional application No. 63/050,120, filed on Jul. 10, 2020.

(51) Int. Cl.
*H04N 5/3745* (2011.01)
*H04N 5/378* (2011.01)

(52) U.S. Cl.
CPC ........... *H04N 5/3745* (2013.01); *H04N 5/378* (2013.01)

(58) Field of Classification Search
CPC .............................. H04N 5/3745; H04N 5/378
See application file for complete search history.

(56) References Cited

U.S. PATENT DOCUMENTS

| | | | | |
|---|---|---|---|---|
| 8,946,613 B2* | 2/2015 | Yin | ....................... | H04N 5/3575 250/214 R |
| 10,097,781 B2* | 10/2018 | Kim | ...................... | H04N 5/3575 |
| 10,498,998 B2* | 12/2019 | Yin | ......................... | H04N 5/378 |
| 2014/0124648 A1* | 5/2014 | Yin | ....................... | H04N 5/3575 250/208.1 |
| 2017/0339359 A1* | 11/2017 | Kim | ......................... | H04N 5/378 |
| 2018/0352183 A1* | 12/2018 | Yin | ......................... | H04N 5/345 |

* cited by examiner

*Primary Examiner* — Nicholas G Giles
(74) *Attorney, Agent, or Firm* — JCIPRNET

(57) ABSTRACT

A dynamic vision sensor, including a first sensing pixel, another first sensing pixel, a storage capacitor, and another storage capacitor, is provided. The first sensing pixel includes a plurality of color light sensing sub-pixels, a first pixel circuit, an infrared light sensing sub-pixel, a second pixel circuit, and a ramp capacitor. The ramp capacitor is coupled to a ramp up signal. The second pixel circuit outputs a sensing result of the infrared light sensing sub-pixel to the storage capacitor. The another first sensing pixel includes another plurality of color light sensing sub-pixels, another first pixel circuit, another infrared light sensing sub-pixel, another second pixel circuit, and another ramp capacitor. The another ramp capacitor is coupled to a ramp down signal. The another second pixel circuit outputs a sensing result of the another infrared light sensing sub-pixel to the another storage capacitor.

13 Claims, 3 Drawing Sheets

DYNAMIC VISION SENSOR

CROSS-REFERENCE TO RELATED APPLICATION

This application claims the priority benefit of U.S. Provisional Application No. 63/050,120, filed on Jul. 10, 2020. The entirety of the above-mentioned patent application is hereby incorporated by reference herein and made a part of this specification.

BACKGROUND

Technical Field

The invention relates to a sensor, and particularly relates to a dynamic vision sensor.

Description of Related Art

At present, dynamic vision sensor (DVS) is widely used in various technical fields, such as automatic driving technology. However, the current dynamic vision sensor needs to be designed with a complicated circuit. Moreover, since the current dynamic vision sensor cannot be effectively integrated with an RGB image sensor, a dynamic sensing operation and an image sensing operation cannot be performed at the same time to effectively obtain corresponding sensing image information when a dynamic event occurs. Therefore, solutions of several embodiments are provided below.

SUMMARY

The invention is directed to a dynamic vision sensor, which has a good dynamic sensing function.

The invention provides a dynamic vision sensor including a first sensing pixel, another first sensing pixel, a storage capacitor, and another storage capacitor. The first sensing pixel includes a plurality of color light sensing sub-pixels, a first pixel circuit, an infrared light sensing sub-pixel, a second pixel circuit, and a ramp capacitor. The ramp capacitor is coupled between a ramp up signal and a first node. The color light sensing sub-pixels are coupled to the first node. The first pixel circuit is coupled to the first node and configured to sequentially output sensing results of the color light sensing sub-pixels. The infrared light sensing sub-pixel is coupled to the first node. The second pixel circuit is coupled to the first node, and is configured to output a sensing result of the infrared light sensing sub-pixel. The another first sensing pixel includes another plurality of color light sensing sub-pixels, another first pixel circuit, another infrared light sensing sub-pixel, another second pixel circuit and another ramp capacitor. The another plurality of color light sensing sub-pixels are coupled to another first node. The another first pixel circuit is coupled to the another first node, and is configured to sequentially output sensing results of the another plurality of color light sensing sub-pixels. The another infrared light sensing sub-pixel is coupled to the another first node. The another second pixel circuit is coupled to the another first node, and is configured to output a sensing result of the another infrared light sensing sub-pixel. The another ramp capacitor is coupled between a ramp down signal and the another first node. The storage capacitor is coupled to the first node through a switch transistor, and is configured to store the sensing result of the infrared light sensing sub-pixel. The another storage capacitor is coupled to the another first node through another switch transistor, and is configured to store the sensing result of the another infrared light sensing sub-pixel.

Based on the above description, the dynamic vision sensor of the invention may obtain a sensing image through multiple color light sensing sub-pixels in the sensing pixel, and may simultaneously sense whether a current sensing object corresponds to a dynamic event during a process that a plurality of infrared light sensing sub-pixels in the sensing pixel photograph a sensing image.

To make the aforementioned more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
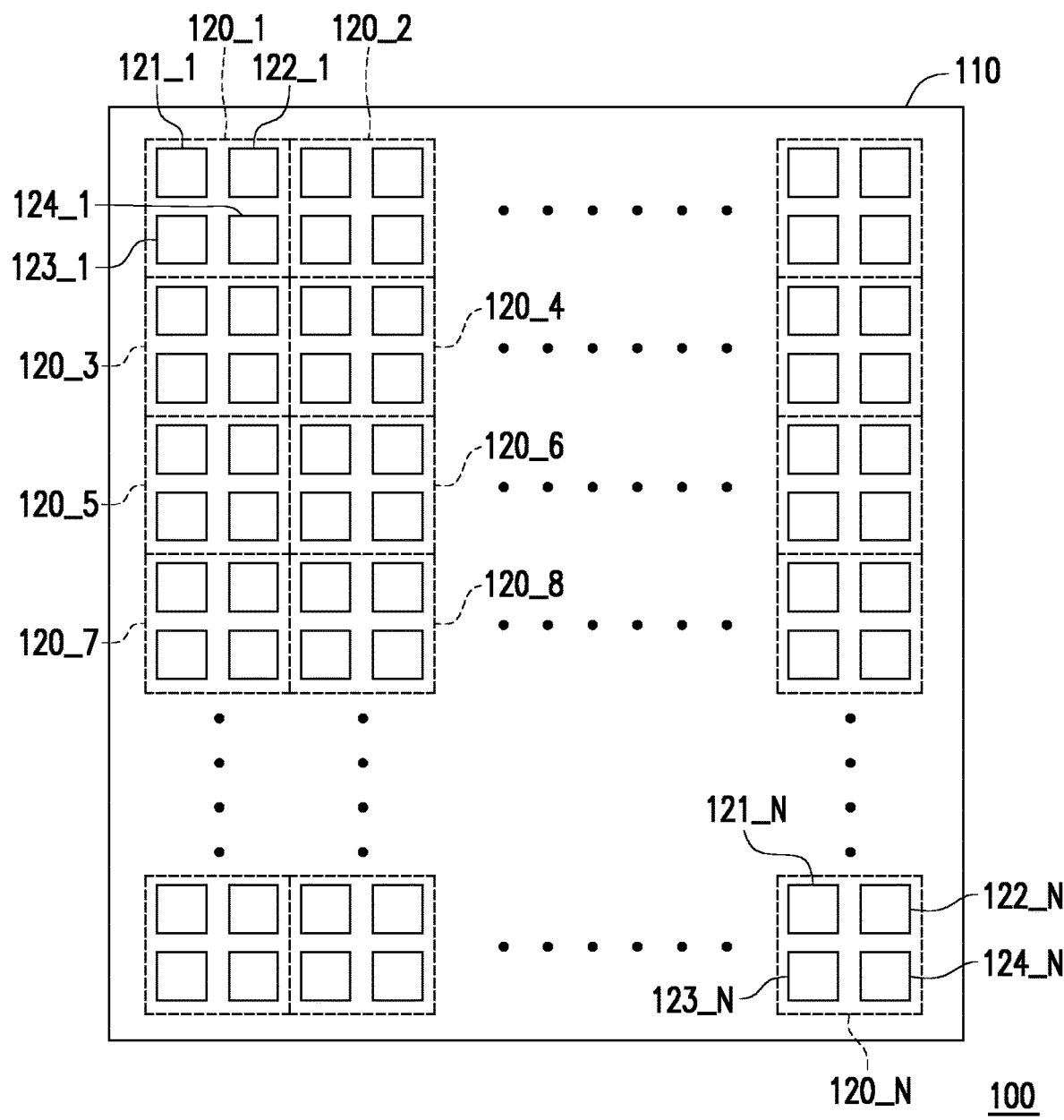
FIG. 1 is a schematic diagram of a pixel array of a dynamic vision sensor according to an embodiment of the invention.

Reference will now be made in detail to the present preferred embodiments of the invention, examples of which are illustrated in the accompanying drawings. Wherever possible, components/members/steps using the same referential numbers in the drawings and description refer to the same or like parts.

FIG. 1 is a schematic diagram of a pixel array of a dynamic vision sensor according to an embodiment of the invention. Referring to FIG. 1, the dynamic vision sensor 100 includes a pixel array 110, and the pixel array 110 includes a plurality of sensing pixels 120_1-120_N arranged in an array, where N is a positive integer greater than 1. In the embodiment, the sensing pixel 120_1 includes a plurality of color light sensing sub-pixels 121_1, 122_1, 123_1 and an infrared light sensing sub-pixel 124_1. Deduced by analogy, the sensing pixels 120_2-120_N include a plurality of color light sensing sub-pixels 121_2-121_N, 122_2-122_N, 123_2-123_N, and infrared light sensing sub-pixels 124_2-124_N. In the embodiment, the color light sensing sub-pixels 121_1-121_N may be, for example, red light sensing sub-pixels. The color light sensing sub-pixels 122_1-122_N may be, for example, green light sensing sub-pixels. The color light sensing sub-pixels 123_1-123_N may be, for example, blue light sensing sub-pixels. The infrared light sensing sub-pixels 124_2-124_N may be used to sense infrared light. However, the arrangement and sequence of the multiple color light sensing sub-pixels and infrared light sensing sub-pixels of each sensing pixel of the invention are not limited to FIG. 1.

In the embodiment, the sensing pixels 120_1-120_N respectively include a first pixel circuit and a second pixel circuit, and the first pixel circuit and the second pixel circuit may be respectively arranged (or fabricated) in active regions that form pixel regions of the plurality of sensing sub-pixels in the pixel array 110, so as to effectively save an area of a peripheral region outside the pixel array 110 used for arranging related functional circuits of the dynamic vision sensor 100. In the embodiment, the peripheral region outside the pixel array 110 of the dynamic vision sensor 100 may be provided with, for example, an analog front end (AFE) circuit, an analog to digital converter (ADC) circuit, and a digital signal processor (DSP) circuit, etc., which is not limited by the invention.

In the embodiment, the dynamic vision sensor 100 may be a complementary metal-oxide semiconductor image sensor (CIS). In the embodiment, the first pixel circuit of each sensing pixel may be used to sequentially output sensing results of the plurality of color light sensing sub-pixels in each sensing pixel. The second pixel circuit of each sensing pixel may be used to sequentially output a sensing result of the infrared light sensing sub-pixel in each sensing pixel. Therefore, the dynamic vision sensor 100 of the embodiment may be used to realize an image sensing function and a visual dynamic sensing function.

It should be noted that the color light sensing sub-pixels 121_1-121_N, 122_1-122_N, and 123_1-123_N of the embodiment are suitable for executing an exposure operation of a rolling shutter, and the infrared light sensing sub-pixels 124_1-124_N are suitable for executing an exposure operation of a global shutter. In the embodiment, when the dynamic vision sensor 100 performs an image sensing operation of a frame through the color light sensing sub-pixels 121_1-121_N, 122_1-122_N, 123_1-123_N, the dynamic vision sensor 100 may perform visual dynamic sensing operations through the infrared light sensing sub-pixels 124_1-124_N. In the embodiment, during a frame period, the dynamic vision sensor 100 may output image data of a color image according to sensing results of the overall color light sensing sub-pixels, and may output an infrared light dynamic image according to sensing results of the overall infrared light sensing sub-pixels.

Figure 2:
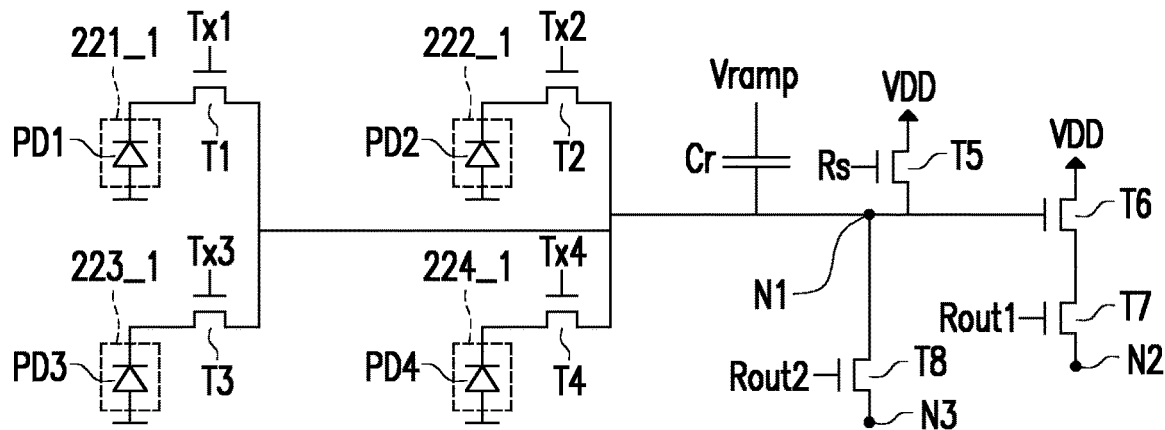
FIG. 2 is a schematic circuit diagram of a sensing pixel according to an embodiment of the invention.

FIG. 2 is a schematic circuit diagram of a sensing pixel according to an embodiment of the invention. Referring to FIG. 2, each of the sensing pixels 120_1-120_N of FIG. 1 may have a pixel circuit configuration of a sensing pixel 200 as shown in FIG. 2. In the embodiment, the sensing pixel 200 includes color light sensing sub-pixels 221_1, 222_1, 223_1 and an infrared light sensing sub-pixel 224_1, where the color light sensing sub-pixels 221_1, 222_1, 223_1 and the infrared light sensing sub-pixel 224_1 respectively include photodiodes PD1-PD4. In the embodiment, the sensing pixel 200 further includes a ramp capacitor Cr, a reset transistor T5, a source follower transistor T6, a selection transistor T7, and a switch transistor T8. It should be noted that the reset transistor T5, the source follower transistor T6, and the selection transistor T7 of the embodiment may operate as active pixel sensors. It should be noted that the aforementioned first pixel circuit includes the reset transistor T5, the source follower transistor T6, and the selection transistor T7, and the aforementioned second pixel circuit includes the switch transistor T8.

In the embodiment, a first end (a cathode) of the photodiode PD1 is coupled to a first terminal of a transistor T1, and a second end (an anode) of the photodiode PD1 is coupled to a ground voltage. A control terminal of the transistor T1 receives a switching signal Tx1, and a second terminal of the transistor T1 is coupled to a node N1. In the embodiment, a first end (a cathode) of the photodiode PD2 is coupled to a first terminal of a transistor T2, and the second end (an anode) of the photodiode PD2 is coupled to the ground voltage. A control terminal of the transistor T2 receives a switching signal Tx2, and a second terminal of the transistor T2 is coupled to the node N1. In the embodiment, a first end (a cathode) of the photodiode PD3 is coupled to a first terminal of a transistor T3, and the second end (an anode) of the photodiode PD3 is coupled to the ground voltage. A control terminal of the transistor T3 receives a switching signal Tx3, and a second terminal of the transistor T3 is coupled to the node N1. In the embodiment, a first end (a cathode) of the photodiode PD4 is coupled to a first terminal of a transistor T4, and a second end (an anode) of the photodiode PD4 is coupled to the ground voltage. A control terminal of the transistor T4 receives a switching signal Tx4, and a second terminal of the transistor T4 is coupled to the node N1.

In the embodiment, one end of the ramp capacitor Cr is coupled to a ramp signal Vramp, and the other end of the ramp capacitor Cr is coupled to the node N1. In the embodiment, a first terminal of the reset transistor T5 is coupled to an operating voltage VDD, and a second terminal of the reset transistor T5 is coupled to the node N1 (a circuit node). A control terminal of the reset transistor T5 receives a reset signal Rs. In the embodiment, a first terminal of the source follower transistor T6 is coupled to the operating voltage VDD, and a second terminal of the source follower transistor T6 is coupled to a first terminal of the selection transistor T7. A control terminal of the source follower transistor T6 is coupled to the node N1. In the embodiment, a second terminal of the selection transistor T7 is coupled to a node N2, and a control terminal of the selection transistor T7 receives a selection signal Rout1. In the embodiment, a first terminal of the switch transistor T8 is coupled to the node N1, and a second terminal of the switch transistor T8 is coupled to a node N3. A control terminal of the switch transistor T8 receives a selection signal Rout2.

In the embodiment, the node N2 may be coupled to a signal output line of the dynamic vision sensor, and the signal output line may be further coupled to a related signal processing circuit of the dynamic vision sensor, such as the aforementioned analog front-end circuit, analog-to-digital converter circuit, and digital signal processor circuit. Taking an operation of the color light sensing sub-pixel 221_1 as an example, during a reset period of the color light sensing sub-pixel 221_1, the reset transistor T5 and the transistor T1 are turned on, and the other transistors are not turned on, so that potentials of the photodiode PD1 and the node N1 are reset. During an exposure period of the color light sensing sub-pixel 221_1, all of the transistors are not turned on. During a reading period of the color light sensing sub-pixel 221_1, the transistor T7 and the transistor T1 are turned on, and the other transistors are not turned on, so that the source follower transistor T6 operates in a source follower state, and a voltage of the sensing result (an exposure result) of the photodiode PD1 stored in the node N1 is provided to the related signal processing circuit of the dynamic vision sensor from the selection transistor T7 and the node N2. Deduced by analogy, similar operations may be sequentially performed during the reset, exposure and reading periods of the color light sensing sub-pixel 222_1, the color light sensing sub-pixel 223_1, and the color light sensing sub-pixel 224_1 of the sensing pixel 200, and the related signal processing circuit of the dynamic vision sensor may generate a sensing image according to each color pixel sensing result provided by the node N2.

In the embodiment, the node N3 may be coupled to a storage capacitor, where the storage capacitor may be, for example, a metal-insulator-metal (MIM) capacitor. In the embodiment, during the reset period of the infrared light sensing sub-pixel 224_1, the reset transistor T5 and the transistor T4 are turned on, and the other transistors are not turned on, so that potentials of the photodiode PD4 and the node N1 are reset. During the exposure period of the infrared light sensing sub-pixel 224_1, all of the transistors are not turned on. During the reading period of the infrared light sensing sub-pixel 224_1, the switch transistor T8 and the transistor T4 are turned on, and the other transistors are not turned on, so that the switch transistor T8 provides a voltage of a sensing result (an exposure result) of the photodiode PD4 to the storage capacitor. In the embodiment, the storage capacitor may also be coupled to the related signal processing circuit of the dynamic vision sensor.

Figure 3:
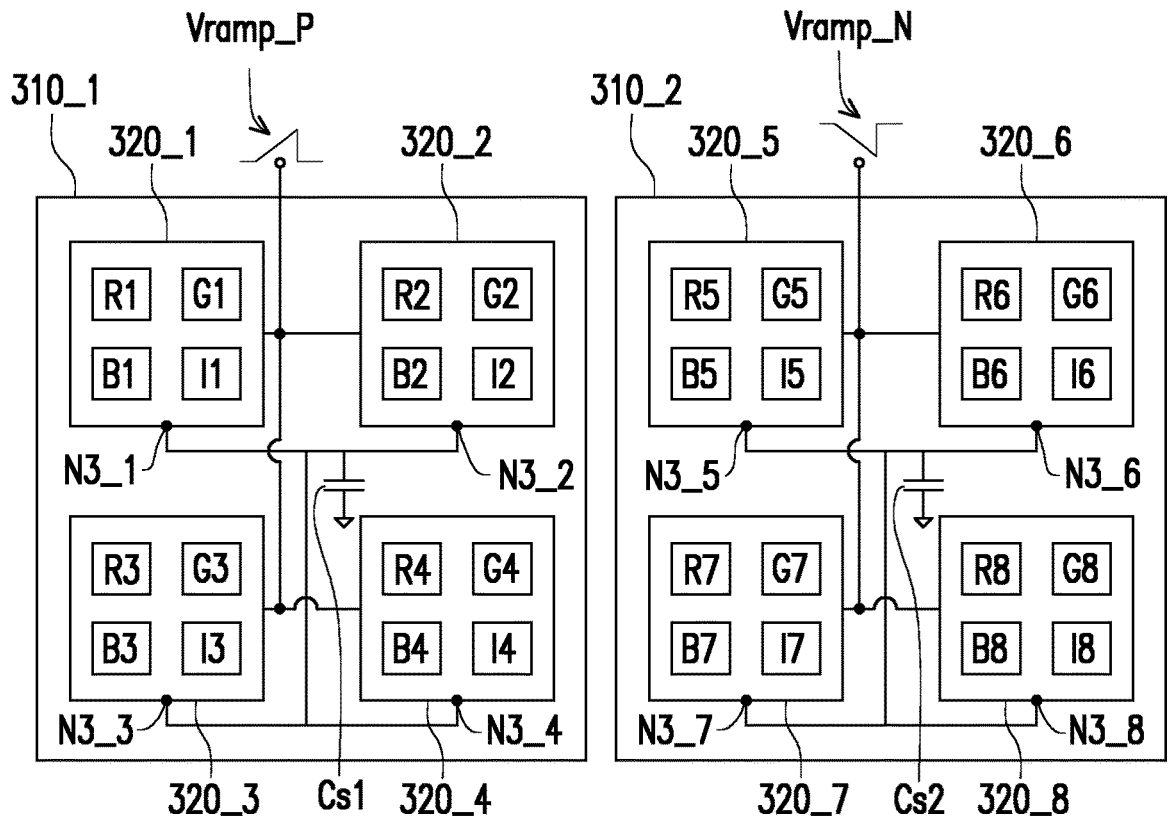
FIG. 3 is a schematic diagram of a first sensing pixel and a second sensing pixel forming a differential pair according to an embodiment of the invention.

FIG. 3 is a schematic diagram of a first sensing pixel and a second sensing pixel forming a differential pair according to an embodiment of the invention. Referring to FIG. 3, a dynamic vision sensor 300 includes a first sensing pixel group 310_1 and a second sensing pixel group 310_2. The first sensing pixel group 310_1 includes sensing pixels 320_1-320_4, and the second sensing pixel group 310_2 includes sensing pixels 320_5-320_8. It should be noted that the sensing pixels 320_1-320_8 may correspond to the sensing pixels 120_1-120_8 in FIG. 1. The pixel array 110 of FIG. 1 may include a plurality of sensing pixel groups. In the embodiment, each of the sensing pixels 320_1-320_8 includes a red light sensing sub-pixel R1-R8, a green light sensing sub-pixel G1-G8, a blue light sensing sub-pixel B1-B8, and an infrared light sensing sub-pixel I1-I2. In the embodiment, the sensing results of a plurality of color light sensing sub-pixels sequentially output by the pixel circuits of each of the sensing pixels of the first sensing pixel group 310_1 and the sensing results of a plurality of other color light sensing sub-pixels sequentially output by the pixel circuits of each of the sensing pixels of the second sensing pixel group 310_2 may form differential outputs, so as to effectively reduce an influence of power noise on the sensing image (color image).

To be specific, the ramp capacitor of each of the sensing pixels 320_1-320_4 of the first sensing pixel group 310_1 may receive a same ramp up signal Vramp_P during the individual reading period of the sensing pixels 320_1-320_4, and the ramp capacitor of each of the sensing pixels 320_5-320_8 of the second sensing pixel group 310_2 may receive a same ramp down signal Vramp_N during the individual reading period of the sensing pixels 320_5-320_8, so as to form a differential output. In this regard, the ramp up signal Vramp_P and the ramp down signal Vramp_N form a differential signal pair, where the ramp up signal Vramp_P has a waveform with a triangular apex angle facing upward (for example, a direction of a voltage increase trend), and the ramp down signal Vramp_N has a waveform with a triangular apex angle facing downward (for example, a direction of a voltage decrease trend).

For example, the sensing results (exposure results) of the red light sensing sub-pixel R1 of the sensing pixel 320_1 and the red light sensing sub-pixel R5 of the sensing pixel 320_5 may be read out at the same time to form a differential output. In the embodiment, the dynamic vision sensor 300 may read out the respective sensing results of the red light sensing sub-pixels R1 and R5 based on a double delta sampling operation, so as to effectively reduce the noise (power supply), and may effectively read a real digital number (DN) value. In addition, an analog-to-digital converter (ADC) resolution of the color light sensing sub-pixels read by the dynamic vision sensor 300 of the embodiment may, for example, correspond to a data amount of 10 bits.

Deduced by analogy, the respective color light sensing sub-pixels of the sensing pixel 320_1 and the sensing pixel 320_5 form the differential output. The respective color light sensing sub-pixels of the sensing pixel 320_2 and the sensing pixel 320_6 form the differential output. The respective color light sensing sub-pixels of the sensing pixel 320_3 and the sensing pixel 320_7 form the differential output. The respective color light sensing sub-pixels of the sensing pixel 320_4 and the sensing pixel 320_8 form the differential output. It should be noted that the multiple color light sensing sub-pixels of the sensing pixels 320_1-320_4 operate in a rolling shutter operation mode. Therefore, operation timings of the color light sensing sub-pixels of the sensing pixels 320_1-320_4 are not synchronized with each other, but operation timings of the color light sensing sub-pixels of the sensing pixels 320_1-320_4 are synchronized with operation timings of the corresponding color light sensing sub-pixels of the sensing pixels 320_5-320_8.

In the embodiment, the infrared light sensing sub-pixels I1-I4 of the first sensing pixel group 310_1 and the infrared light sensing sub-pixels I5-I8 of the second sensing pixel group 310_2 may perform the reset operation, the exposure operation and the reading operation during a partially overlapped period or non-overlapped period. To be specific, the infrared light sensing sub-pixels I1-I8 of the sensing pixels 320_1-320_8 operate in a global shutter operation mode. It should be noted that, in order to effectively perform dynamic sensing, the dynamic vision sensor 300 of the embodiment respectively performs sensing within two extremely short exposure periods through the infrared light sensing sub-pixel I1-I4 and the infrared light sensing sub-pixel I5-I8, so that an image intensity thereof is relatively low. Therefore, in order to increase the image intensity of the sensing result, in the embodiment, the four infrared light sensing sub-pixels are taken as a group to store a total sensing result thereof. In this regard, the infrared light sensing sub-pixels I1-I4 of the sensing pixels 320_1-320_4 may perform the reset, exposure, and reading operations at the same time to obtain one infrared light image, and the infrared light sensing sub-pixels I5-I8 of the sensing pixels 320_5-320_8 may perform the reset, exposure, and reading operations at the same time to obtain another infrared light image.

In the embodiment, the exposure period of the infrared light sensing sub-pixels I1-I4 of the sensing pixels 320_1-320_4 and the exposure period of the infrared light sensing sub-pixels I5-I8 of the sensing pixels 320_5-320_8 may be partially overlapped or not overlapped. For example, the infrared light sensing sub-pixels I1-I4 of the sensing pixels 320_1-320_4 may simultaneously store exposure results of the sensing pixels 320_1-320_4 to the storage capacitor Cs1 through nodes N3_1-N3_4 (similar to the node N3 of the embodiment of FIG. 2) during a first reading period. One end of the storage capacitor Cs1 is coupled to the nodes N3_1-N3_4, and the other end of the storage capacitor Cs1 is grounded. The infrared light sensing sub-pixels I5-I8 of the sensing pixels 320_5-320_8 may simultaneously store exposure results of the sensing pixels 320_5-320_8 to the storage capacitor Cs2 through nodes N3_5-N3_8 (similar to the node N3 of the embodiment of FIG. 2) during a second reading period. One end of the storage capacitor Cs2 is coupled to the nodes N3_5-N3_8, and the other end of the storage capacitor Cs2 is grounded. In addition, the analog-to-digital converter resolution of the infrared light sensing sub-pixels read by the dynamic vision sensor 300 of the embodiment (a total sensing result of the infrared light sensing sub-pixels I1-I4 or the infrared light sensing sub-pixels I5-I8) may, for example, correspond to a data amount of 4 bits.

In the embodiment, the signal processing circuit of the dynamic vision sensor 300 may respectively read storage results (charge values) of the storage capacitor Cs1 and the storage capacitor Cs2, and may compare the storage result of the storage capacitor Cs1 and the storage result of the storage capacitor Cs2 to generate an infrared light dynamic image, which effectively determines whether the currently sensed sensing image of the dynamic vision sensor 300 corresponds to a dynamic event.

In other words, in order to determine whether the currently sensed sensing image of the dynamic vision sensor 300 corresponds to the dynamic event, the dynamic vision sensor 300 of the embodiment may quickly sense two infrared light images in a mode of shorter exposure time at a same time during a process of executing color image sensing (with a longer exposure time), and it may be effectively determined whether the current sensing object of the dynamic vision sensor 300 has a dynamic event such as movement or motion change, etc., by determining whether there is a difference between the two infrared light images (for example, through a pixel value comparison).

Figure 4:
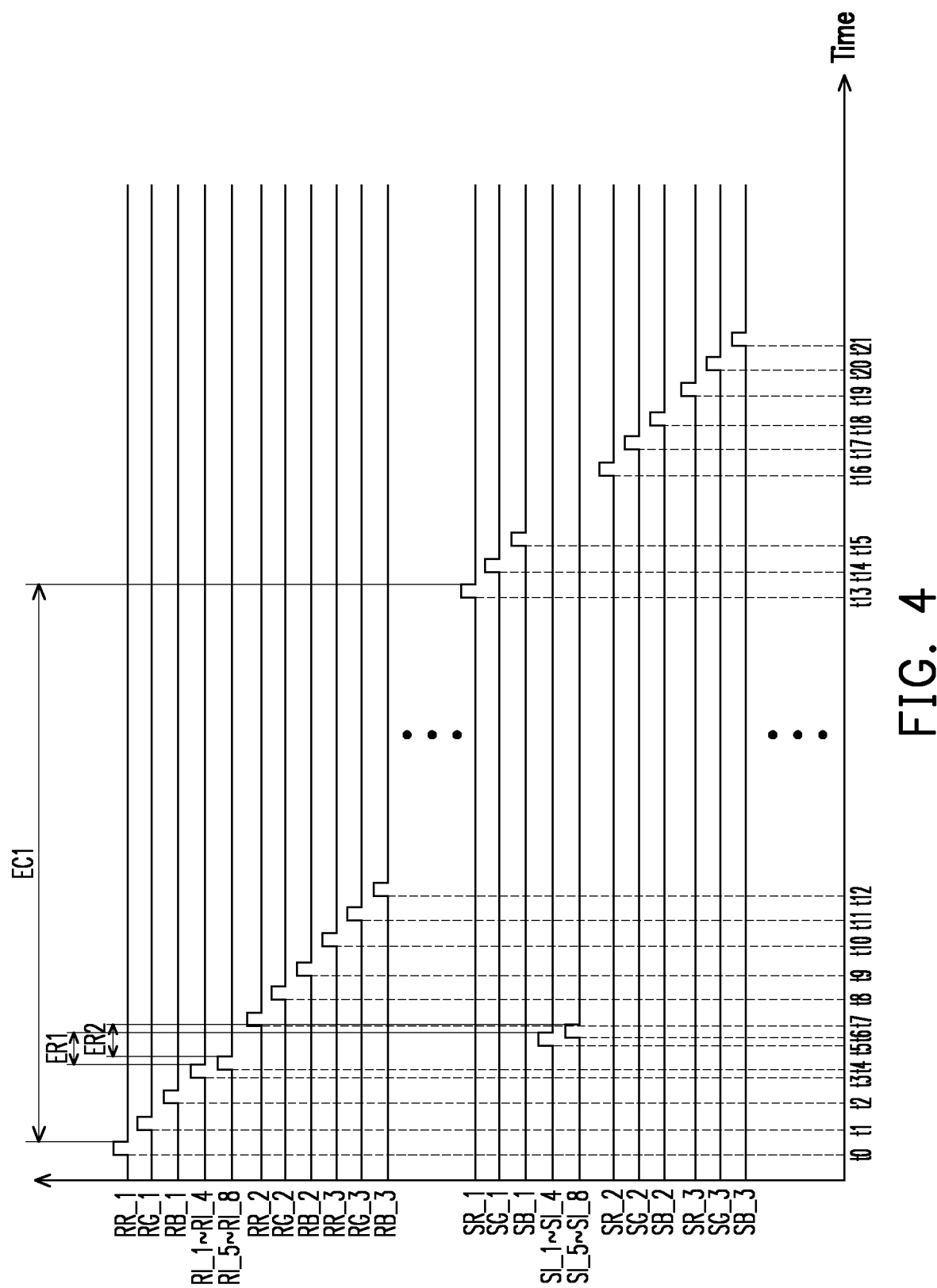
FIG. 4 is an operation timing diagram of a dynamic vision sensor according to an embodiment of the invention.

FIG. 4 is an operation timing diagram of a dynamic vision sensor according to an embodiment of the invention. Referring to FIG. 3 and FIG. 4, the dynamic vision sensor 300 may implement the operation timing as shown in FIG. 4. In the embodiment, as shown by a reset timing RR_1, the red light sensing sub-pixels R1 and R5 may perform the reset operation at a time t0. As shown by a reset timing RG_1, the green light sensing sub-pixels G1 and G5 may perform the reset operation at a time t1. As shown by a reset timing RB_1, the blue light sensing sub-pixels B1 and B5 may perform the reset operation at a time t2. As shown by reset timings RI_1-RI_4, the infrared light sensing sub-pixels I1-I4 may perform the reset operation at a time t3. As shown by reset timings RI_5-RI_8, the infrared light sensing sub-pixels I5-I8 may perform the reset operation at a time t4. It should be noted that a first reset period of the infrared light sensing sub-pixels I1-I4 and a second reset period of the infrared light sensing sub-pixels I5-I8 may be partially overlapped or not overlapped. Then, as shown by a reset timing RR_2, the red light sensing sub-pixels R2 and R6 may perform the reset operation at a time t7. As shown by a reset timing RG_2, the green light sensing sub-pixels G2 and G6 may perform the reset operation at a time t8. As shown by the reset timing RB_2, the blue light sensing sub-pixels B2 and B6 may perform the reset operation at a time t9. Then, as shown by a reset timing RR_3, the red light sensing sub-pixels R3 and R7 may perform the reset operation at a time t10. As shown by a reset timing RG_3, the green light sensing sub-pixels G3 and G7 may perform the reset operation at a time t11. As shown by a reset timing RB_3, the blue light sensing sub-pixels B3 and B7 may perform the reset operation at a time t12. Deduced by analogy, the respective multiple color light sensing sub-pixels of the sensing pixels 320_4, 320_8 may sequentially perform the reset operation.

In the embodiment, as shown by a read timing SR_1, the red light sensing sub-pixels R1 and R5 may perform the reading operation at a time t13. As shown by a read timing SG_1, the green light sensing sub-pixels G1 and G5 may perform the reading operation at a time t14. As shown by a read timing SB_1, the blue light sensing sub-pixels B1 and B5 may perform the reading operation at a time t15. As shown by a read timing SR_2, the red light sensing sub-pixels R2 and R6 may perform the reading operation at a time t16. As shown by a read timing SG_2, the green light sensing sub-pixels G2 and G6 may perform the reading operation at a time t17. As shown by a read timing SB_2, the blue light sensing sub-pixels B2 and B6 may perform the reading operation at a time t18. Then, as shown by a read timing SR_3, the red light sensing sub-pixels R3 and R7 may perform the reading operation at a time t19. As shown by a read timing SG_3, the green light sensing sub-pixels G3 and G7 may perform the reading operation at a time t20. As shown by a read timing SB_3, the blue light sensing sub-pixels B3 and B7 may perform the reading operation at a time t21. Deduced by analogy, the respective multiple color light sensing sub-pixels of the sensing pixels 320_4, 320_8 may sequentially perform the reading operation. It should be noted that the reading operation here refers to an operation that each of the color light sensing sub-pixels make the charges generated by the photodiode after exposure to be transferred to a floating diffusion node from the photodiode based on the switching results of the transistors (similar to the transistors T1-T3 in the embodiment of FIG. 2).

In the embodiment, by comparing the reset timings RI_1-RI_4 with the read timings SI_1-SI_4, between the time t3 and the time t5, after the infrared light sensing sub-pixels I1-I4 finish the reset period, the infrared light sensing sub-pixels I1-I4 then enter an exposure period ER1, and the infrared light sensing sub-pixels I1-I4 start the reading operation at the time t5. By comparing the reset timings RI_5-RI_8 with the read timings SI_5-SI_8, between the time t4 and the time t6, after the infrared light sensing sub-pixels I5-I8 finish the reset period, the infrared light sensing sub-pixels I5-I8 then enter an exposure period ER2, and the infrared light sensing sub-pixels I5-I8 start the reading operation at the time t6. It should be noted that the reading operation here refers to an operation that each of the infrared light sensing sub-pixels make the charges generated by the photodiode after exposure to be transferred to the storage capacitors (similar to the storage capacitors Cs1, Cs2 in the embodiment of FIG. 3) from the photodiode based on the switching results of the transistors (similar to the transistors T4, T8 in the embodiment of FIG. 2). The exposure period ER1 and the exposure period ER2 may be partially overlapped or not overlapped.

As shown in FIG. 4, the exposure period ER1 of the infrared light sensing sub-pixels I1-I4 and the exposure period ER2 of the infrared light sensing sub-pixels I5-I8 are shorter than the exposure period of the color light sensing sub-pixels (for example, an exposure period EC1 of the red light sensing sub-pixels R1-R5). Therefore, the dynamic vision sensor 300 of the embodiment may quickly sense two infrared light images at the same time in the process of obtaining a sensing image (a color image), and may effectively determine whether the current sensing object of the dynamic vision sensor 300 has a dynamic event such as movement or motion change, etc., by determining whether there is a difference between the two infrared light images (for example, through a pixel value comparison). In addition, the timings of the reset, exposure, and reading periods of the infrared light sensing sub-pixels of the invention are not limited to that shown FIG. 4. The timings of the reset, exposure, and reading periods of the infrared light sensing sub-pixels of the invention may be arranged at any time interval in the process of obtaining a sensing image by the color light sensing sub-pixels.

In summary, the dynamic vision sensor of the invention may include a plurality of color light sensing sub-pixels and a plurality of infrared light sensing sub-pixels, and the sensing sub-pixels of the invention may be used to simultaneously perform dynamic sensing in the process of obtaining a sensing image, so as to effectively determine whether a sensing object in the sensing image has any dynamic event such as movement or motion change.

It will be apparent to those skilled in the art that various modifications and variations can be made to the disclosed embodiments without departing from the scope or spirit of the invention. In view of the foregoing, it is intended that the invention covers modifications and variations provided they fall within the scope of the following claims and their equivalents.

What is claimed is:

1. A dynamic vision sensor, comprising:
   a first sensing pixel, comprising:
      a plurality of color light sensing sub-pixels, coupled to a first node;
      a first pixel circuit, coupled to the first node and configured to sequentially output sensing results of the color light sensing sub-pixels;
      an infrared light sensing sub-pixel, coupled to the first node;
      a second pixel circuit, coupled to the first node and configured to output a sensing result of the infrared light sensing sub-pixel; and
      a ramp capacitor, coupled between a ramp up signal and the first node;
   another first sensing pixel, comprising:
      another plurality of color light sensing sub-pixels, coupled to another first node;
      another first pixel circuit, coupled to the another first node and configured to sequentially output sensing results of the another color light sensing sub-pixels;
      another infrared light sensing sub-pixel, coupled to the another first node;
      another second pixel circuit, coupled to the another first node and configured to output a sensing result of the another infrared light sensing sub-pixel; and
      another ramp capacitor, coupled between a ramp down signal and the another first node;
   a storage capacitor, coupled to the first node through a switch transistor of the second pixel circuit and configured to store the sensing result of the infrared light sensing sub-pixel; and
   another storage capacitor, coupled to the another first node through another switch transistor of the another second pixel circuit and configured to store the sensing result of the another infrared light sensing sub-pixel.

2. The dynamic vision sensor as claimed in claim 1, wherein a comparison result of a storage result of the storage capacitor and a storage result of the another storage capacitor is configured to determine whether a sensing image generated by a plurality of the infrared light sensing sub-pixels and another plurality of the infrared light sensing sub-pixels corresponds to a dynamic event.

3. The dynamic vision sensor as claimed in claim 2, further comprising:
   at least one second sensing pixel, coupled to the storage capacitor; and
   at least another second sensing pixel, coupled to the another storage capacitor.

4. The dynamic vision sensor as claimed in claim 3, wherein all of the infrared light sensing sub-pixels of the first sensing pixel and the at least one second sensing pixel are simultaneously exposed during an exposure period, and all of the infrared light sensing sub-pixels of the another first sensing pixel and the at least another second sensing pixel are simultaneously exposed during another exposure period.

5. The dynamic vision sensor as claimed in claim 4, wherein the exposure period and the another exposure period are partially overlapped or not overlapped.

6. The dynamic vision sensor as claimed in claim 1, wherein the storage capacitor and the another storage capacitor are respectively a metal-insulator-metal capacitor.

7. The dynamic vision sensor as claimed in claim 1, wherein during a frame period, the dynamic vision sensor outputs a color image according to a sensing result of the overall color light sensing sub-pixels, and outputs an infrared light dynamic image according to a sensing result of the overall infrared light sensing sub-pixels.

8. The dynamic vision sensor as claimed in claim 1, wherein the sensing results sequentially output by the color light sensing sub-pixels of the first pixel circuit and the sensing results sequentially output by the another color light sensing sub-pixels of the another first pixel circuit form a differential output.

9. The dynamic vision sensor as claimed in claim 1, wherein the color light sensing sub-pixels and the another color light sensing sub-pixels respectively comprise a red light sensing sub-pixel, a green light sensing sub-pixel, and a blue light sensing sub-pixel.

10. The dynamic vision sensor as claimed in claim 1, wherein the color light sensing sub-pixels, the another color light sensing sub-pixels, the infrared light sensing sub-pixel, and the another infrared light sensing sub-pixel respectively comprise a photodiode.

11. The dynamic vision sensor as claimed in claim 1, wherein the first pixel circuit and the another first pixel circuit respectively comprise:
   a reset transistor, wherein a first terminal of the reset transistor is coupled to a reset voltage;
   a source follower transistor, wherein a first terminal of the source follower transistor is coupled to an operating voltage, and a control terminal of the source follower transistor is coupled to a second terminal of the reset transistor; and
   a selection transistor, wherein a first terminal of the selection transistor is coupled to a second terminal of the source follower transistor.

12. The dynamic vision sensor as claimed in claim 1, wherein the overall color light sensing sub-pixels of the dynamic vision sensor are adapted to be executed with an exposure operation of a rolling shutter, and the overall infrared light sensing sub-pixels of the dynamic vision sensor are adapted to be executed with an exposure operation of a global shutter.

13. The dynamic vision sensor as claimed in claim 1, further comprising a pixel array, wherein the pixel array is composed of a plurality of first sensing pixels and another plurality of first sensing pixels.

* * * * *